United States Patent
Yang et al.

(10) Patent No.: US 9,798,821 B2
(45) Date of Patent: Oct. 24, 2017

(54) NAVIGATION SYSTEM WITH CLASSIFICATION MECHANISM AND METHOD OF OPERATION THEREOF

(71) Applicant: Telenav, Inc., Sunnyvale, CA (US)

(72) Inventors: Jianyi Yang, Santa Clara, CA (US); Kumar Maddali, San Ramon, CA (US)

(73) Assignee: Telenav, Inc., Santa Clara, CA (US)

( * ) Notice: Subject to any disclaimer, the term of this patent is extended or adjusted under 35 U.S.C. 154(b) by 0 days.

(21) Appl. No.: 14/562,461

(22) Filed: Dec. 5, 2014

(65) Prior Publication Data

US 2015/0160017 A1 Jun. 11, 2015

Related U.S. Application Data

(60) Provisional application No. 61/913,524, filed on Dec. 9, 2013.

(51) Int. Cl.
*G01C 21/00* (2006.01)
*G06F 17/30* (2006.01)
*G01C 21/36* (2006.01)

(52) U.S. Cl.
CPC ..... *G06F 17/3087* (2013.01); *G01C 21/3679* (2013.01)

(58) Field of Classification Search
CPC .............. G06F 17/3087; G01C 21/3679
USPC ....................................... 701/400
See application file for complete search history.

(56) References Cited

U.S. PATENT DOCUMENTS

| | | | |
|---|---|---|---|
| 2001/0053956 A1* | 12/2001 | Ohishi | G01C 21/36 701/425 |
| 2007/0150174 A1* | 6/2007 | Seymour | G01C 21/3617 701/532 |
| 2009/0119234 A1 | 5/2009 | Pinckney et al. | |
| 2012/0173464 A1 | 7/2012 | Tur et al. | |
| 2013/0268468 A1 | 10/2013 | Vijayaraghavan et al. | |

OTHER PUBLICATIONS

Green et al., Alida: "Using Machine Learning for Intent Discernment in Visual Analytics Interfaces", p. 262-263.
Green et al., Alida: "Using Machine Learning for Intent Discernment in Visual Analytics Interfaces", p. 262-263.
Chen et al., Microsoft: "Machine Learning" http://research.microsoft.com/en-us/groups/ml/.
Chen et al., "User Intention Modeling in Web Applications Using Data Mining", p. 181-191.
Celikyilmaz et al., "Leveraging Web Query Logs to Learn User Intent Via Bayesian Discrete Latent Variable Model", p. 1-6.

\* cited by examiner

*Primary Examiner* — Maceeh Anwari
(74) *Attorney, Agent, or Firm* — IP Investment Law Group

(57) ABSTRACT

A method of operation of a navigation system includes: generating a signal weight with a control unit based on a feature extracted from a user activity; generating an activity model based on the signal weight for representing the feature as a positive weight or a negative weight depending on an activity type, a category of interest, or a combination thereof; classifying a user entry based on comparing the feature of the user entry to the feature represented in the activity model; and determining a user's intention based on the user entry classified for presenting a point of interest on a device.

20 Claims, 6 Drawing Sheets

NAVIGATION SYSTEM WITH CLASSIFICATION MECHANISM AND METHOD OF OPERATION THEREOF

CROSS-REFERENCE TO RELATED APPLICATION(S)

This application claims the benefit of U.S. Provisional Patent Application Ser. No. 61/913,524 filed Dec. 9, 2013, and the subject matter thereof is incorporated herein by reference thereto.

TECHNICAL FIELD

The present invention relates generally to a navigation system, and more particularly to a system with classification mechanism.

BACKGROUND ART

Modern portable consumer and industrial electronics, especially client devices such as navigation systems, cellular phones, portable digital assistants, and combination devices, are providing increasing levels of functionality to support modern life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Location based services allow users to create, transfer, store, and/or consume information in order for users to create, transfer, store, and consume in the "real world." One such use of location based services is to efficiently transfer or route users to the desired destination or service.

Navigation systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information.

However, a navigation system improving classification mechanism to categorize entry has become a paramount concern for the consumer. The inability decreases the benefit of using the tool.

Thus, a need still remains for a navigation system with classification mechanism to categorize the entry. In view of the increasing mobility of the workforce and social interaction, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems. Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: generating a signal weight with a control unit based on a feature extracted from a user activity; generating an activity model based on the signal weight for representing the feature as a positive weight or a negative weight depending on an activity type, a category of interest, or a combination thereof; classifying a user entry based on comparing the feature of the user entry to the feature represented in the activity model; and determining a user's intention based on the user entry classified for presenting a point of interest on a device.

The present invention provides a navigation system, including a control unit for: generating a signal weight with a control unit based on a feature extracted from a user activity, generating an activity model based on the signal weight for representing the feature as a positive weight or a negative weight depending on an activity type, a category of interest, or a combination thereof, classifying a user entry based on comparing the feature of the user entry to the feature represented in the activity model, determining a user's intention based on the user entry classified, and a communication interface, coupled to the control unit, for communicating the user's intention for displaying a point of interest on a device.

The present invention provides a navigation system having a non-transitory computer readable medium including: generating a signal weight based on a feature extracted from a user activity; generating an activity model based on the signal weight for representing the feature as a positive weight or a negative weight depending on an activity type, a category of interest, or a combination thereof; classifying a user entry based on comparing the feature of the user entry to the feature represented in the activity model; and determining a user's intention based on the user entry classified for presenting a point of interest on a device.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

Figure 1:
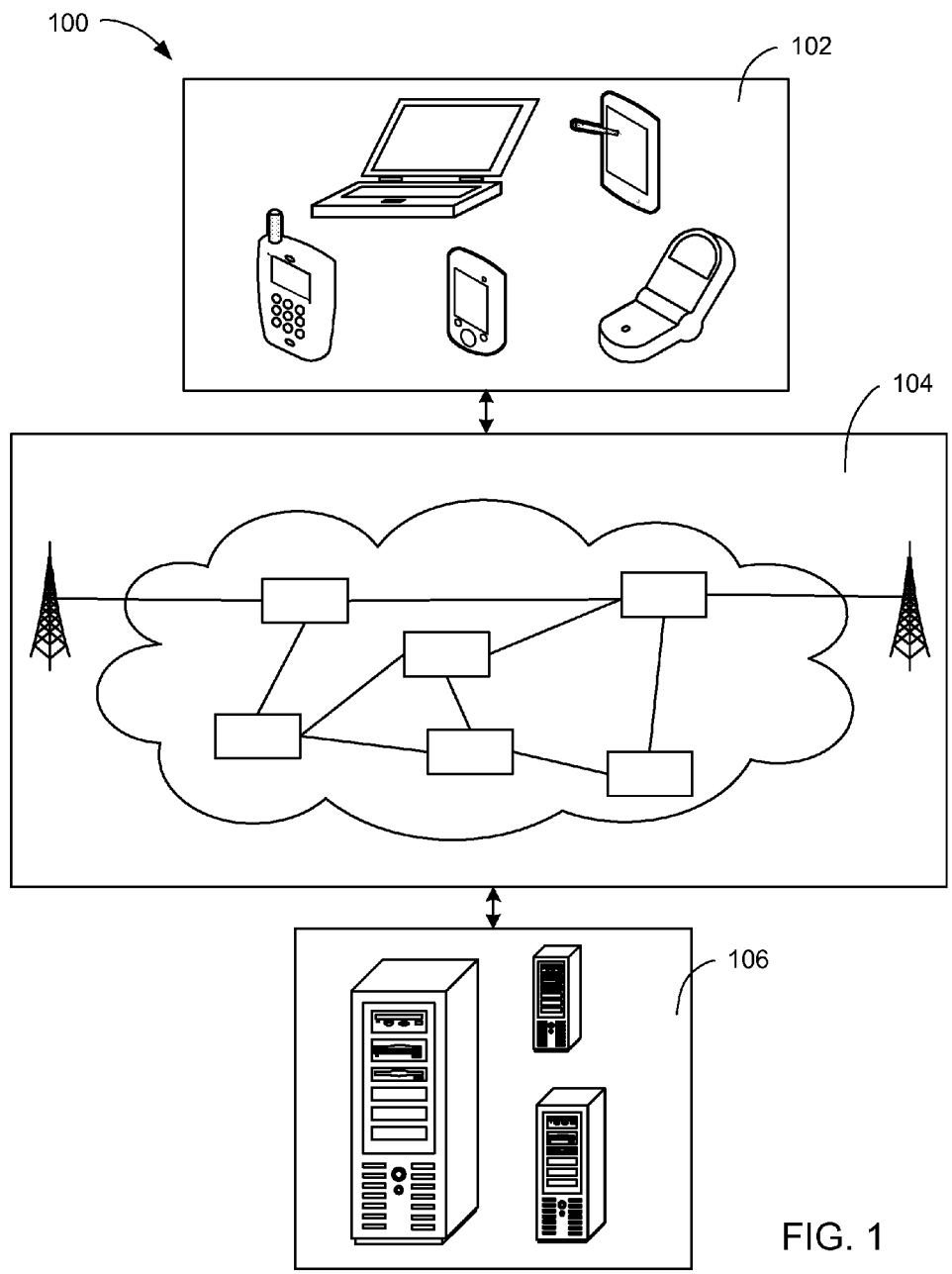
FIG. 1 is a navigation system with classification mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the navigation system 100 are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein includes the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof. Further, if a module is written in the apparatus claims section below, the modules are deemed to include hardware circuitry for the purposes and the scope of apparatus claims.

Referring now to FIG. 1, therein is shown a navigation system 100 with classification mechanism in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer. In another example, the first device 102 can be a particularized machine, such as a mainframe, a server, a cluster server, rack mounted server, or a blade server, or as more specific examples, an IBM System z10™ Business Class mainframe or a HP ProLiant ML™ server.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102. Another example, the first device 102 or the second device 106 can be a particularized machine, such as a portable computing device, a thin client, a notebook, a netbook, a smartphone, a tablet, a personal digital assistant, or a cellular phone, and as specific examples, an Apple iPhone™, Android™ smartphone, or Windows™ platform smartphone.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
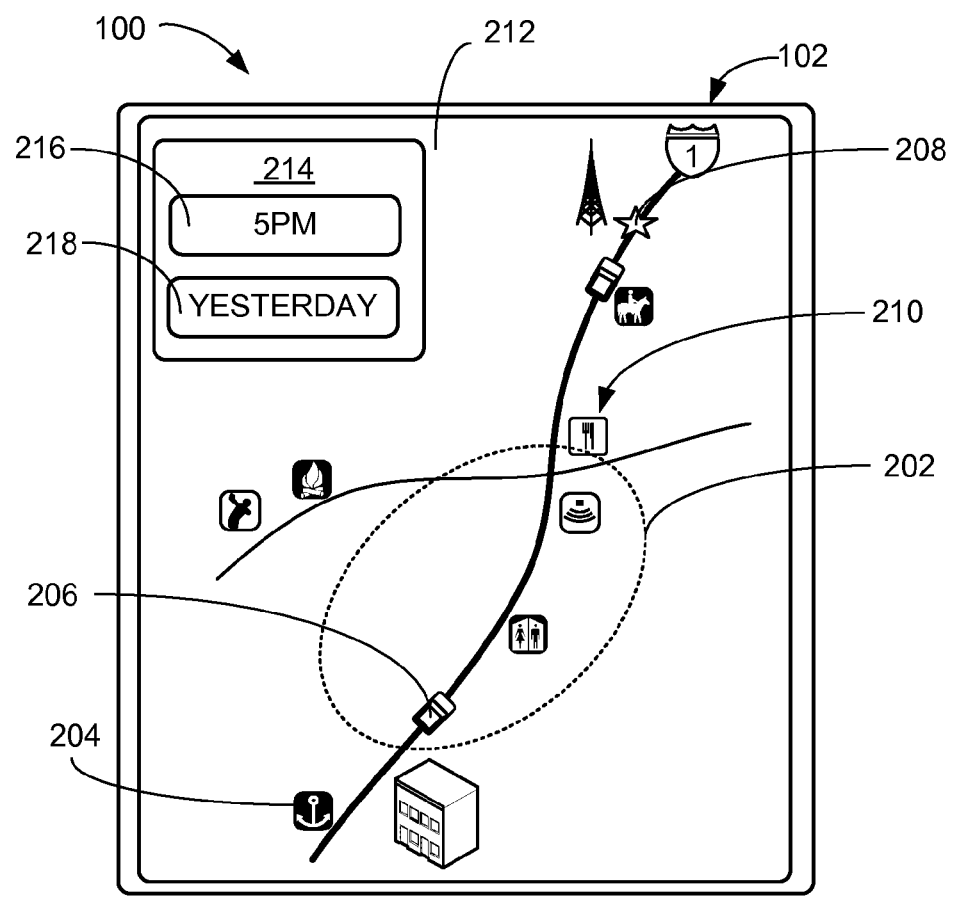
FIG. 2 is an example of a geographic area traveled by the user of the navigation system.

Referring now to FIG. 2, there is shown an example of a geographic area 202 traveled by the user of the navigation system 100. For clarity and brevity, the discussion of the embodiment of the present invention will focus on the first device 102 delivering the result generated by the navigation system 100. However, the second device 106 of FIG. 1 and the first device 102 can be discussed interchangeably.

The geographic area 202 is defined as a representation of a physical area. For example, the geographic area 202 can represent a digital representation of a neighborhood, city, county, state, country, or a combination thereof. The geographic area 202 can include a geographic location 204, which is defined as a representation of a physical location. For example, the first device 102 can display the geographic location 204 as a digital representation of the physical location.

A current location 206 is defined as a representation of where the first device 102 is located. For example, the navigation system 100 can detect the current location 206 representing the digital representation of the physical location where the user of the first device 102 is detected.

The geographic area 202 can include a point of interest 208, which is defined as a representation of a physical location desired. For example, the point of interest 208 can represent a restaurant searched by the user of the navigation system 100. For a different example, the point of interest 208 can represent a physical location targeted as a destination for the user's travel.

The point of interest 208 can be categorized by a category of interest 210. The category of interest 210 is defined as classification of the point of interest 208. For example, the category of interest 210 can include restaurant, shopping, arts and entertainment, hotels and travel, health and medical, nightlife, or a combination thereof.

The user traveling through the geographic area 202 can be situated in a travel context 212. The travel context 212 is defined as a situation or environment surrounding the first device 102. For example, the travel context 212 can include a travel condition 214, such as a timeframe 216, a road type, the current location 206, a travel history 218, or a combination thereof. The road type can include dirt road, local road, arterial road, expressway, freeway, or a combination thereof.

The travel condition 214 is defined as a factor that influences the user's travel. The timeframe 216 is defined as a period of time. For example, the timeframe 216 can represent time of day, week, month, year, season, or a combination thereof. The travel history 218 is defined as user's travel record. For example, the travel history 218 can represent the user's travel record for traversing a particular instance of the geographic area 202. A travel threshold 220 is defined as minimum frequency for traveling. For example, the travel threshold 220 can represent the minimum number of times that the user had travel to the geographic area 202, the geographic location 204, the current location 206, the point of interest 208, or a combination thereof.

Figure 3:
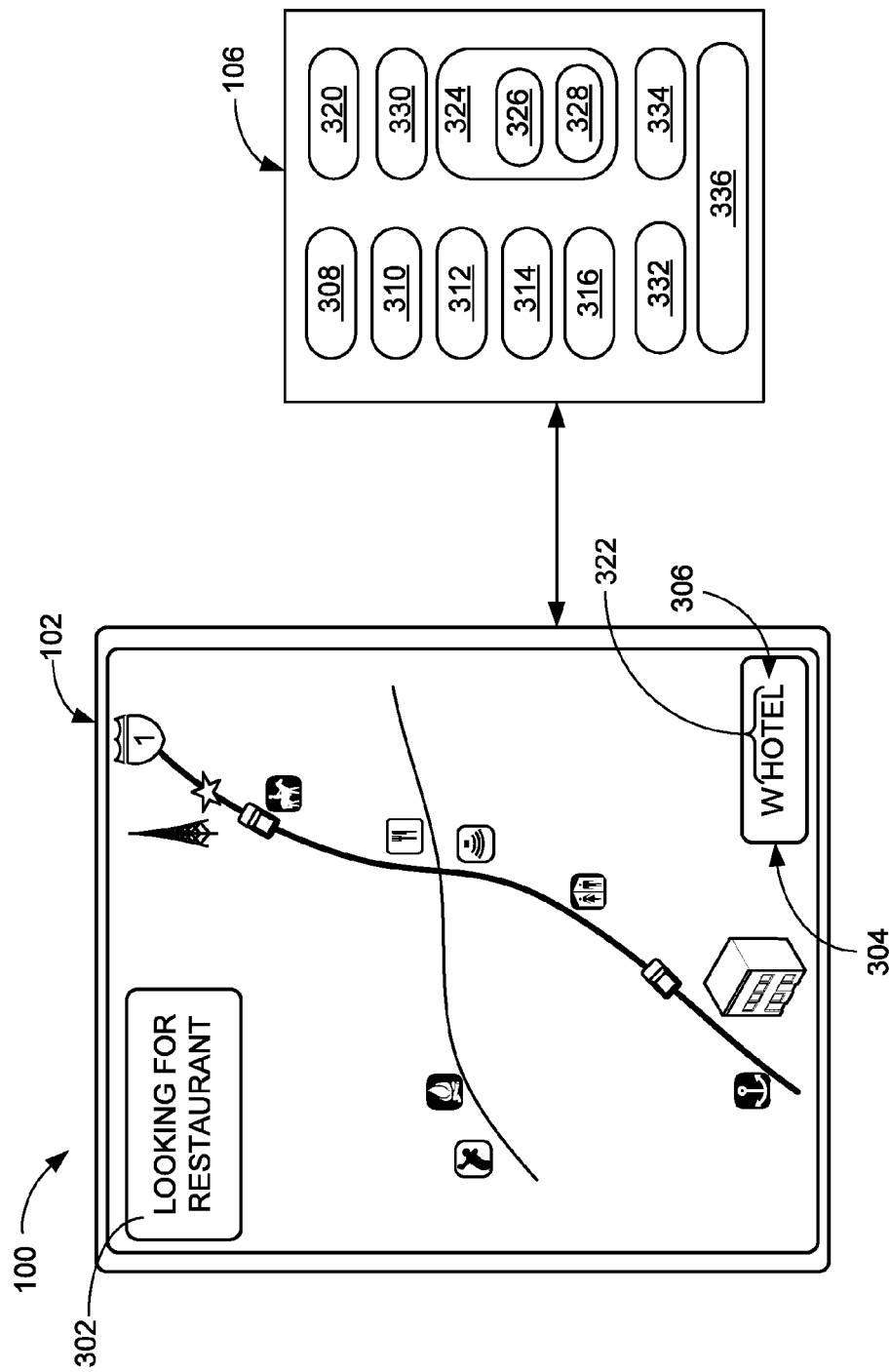
FIG. 3 is an example of the navigation system determining a user's intention.

Referring now to FIG. 3, there is shown an example of the navigation system 100 determining a user's intention 302. For example, the first device 102 and the second device 106 can exchange data to determine the user's intention 302. The user's intention 302 is defined as user's purpose. For example, the user's intention 302 for making a user entry 304 to the navigation system 100 can represent searching for the point of interest 208 of FIG. 2 representing the category of interest 210 for restaurant.

The user entry 304 can represent an input made to the first device 102. For example, the user entry 304 can include manual input, audio command, gesture, or a combination thereof. The user entry 304 can include a search query 306. The search query 306 is defined as input requesting the navigation system 100 to generate a result. For example, the search query 306 can represent a request by the user to the navigation system 100 to locate the point of interest 208 representing a restaurant near the current location 206 of FIG. 2.

The navigation system 100 can track the user entry 304 made by generating an activity history 308 of a user activity 310. The activity history 308 is a record of action performed with the first device 102. For example, the user activity 310 can represent the user entry 304 for the search query 306 made on the first device 102. An activity type 312 is defined as a classification of the user activity 310.

An entry pattern 314 is defined as a tendency of the user entry 304. For example, the entry pattern 314 can indicate that the user tends to make the user entry 304 after eating at a restaurant to write a review about the food. For a different example, the entry pattern 314 can represent the user's habit to search on the navigation system 100 for place to have coffee at a different location from where he or she had dinner.

An entry relevancy 316 is defined as an association between a plurality of the user entry 304. For example, if the plurality of the user entry 304 is made after watching the same movie, the navigation system 100 can determine the entry relevancy 316 between the plurality of the user entry 304 related to that particular movie. The entry relevancy 316 can represent an association between the plurality of the user entry 304 made by the same user, different users, or a combination thereof. The entry relevancy 316 can represent the relationship amongst a plurality of the user entry 304.

For further example, the navigation system 100 can categorize the user entry 304 with an entry category 318. The entry category 318 is defined as a classification of the user entry 304. More specifically as an example, the entry category 318 can correlate to the category of interest 210 by associating the user entry 304 to a specific instance of the category of interest 210.

For example, if the user entry 304 is related to a drug name, the user entry 304 can be categorized to the entry category 318 representing medical or healthcare. For further example, the navigation system 100 can calculate a category score 320 for categorizing the user entry 304. The category score 320 is defined as a value used to classify the user entry 304. The category score 320 can represent an alphanumeric value.

The navigation system 100 can extract a feature 322 from the search query 306. The feature 322 is defined as information from the user activity 310. For example, the feature 322 can include a unique word from the search query 306. The unique word can include proper noun, the timeframe 216 of FIG. 2, the point of interest 208, the category of interest 210 of FIG. 2, the device type, or a combination thereof. For another example, the feature 322 can represent the user activity 310 logged in the activity history 308. More specifically as an example, the feature 322 can represent driving at the timeframe 216 representing 5 pm.

A signal weight 324 is an indicator value. For example, the signal weight 324 can indicate whether user's interest is towards a particular instance of the category of interest 210 or different instance of the category of interest 210. The signal weight 324 can represent an alphanumeric value. More specifically as an example, the signal weight 324 can include a positive weight 326, a negative weight 328, or a combination thereof.

The positive weight 326 can represent the signal weight 324 above a weight threshold 330. The negative weight 328 can represent the signal weight 324 below the weight threshold 330. The weight threshold 330 is defined as a divider value to classify whether the signal weight 324 is positive or negative. For example, the weight threshold 330 can represent an alphanumeric value.

A weight type 332 is a classification of the signal weight 324. For example, the weight type 332 of the signal weight 324 can be classified according to the activity type 312, the category of interest 210, or a combination thereof. For further example, certain instance of the weight type 332 can have a higher instance of a weight priority 334 over another instance of the weight type 332. The weight priority 334 is defined as a superiority of certain instance of the weight type 332 over another instance of the weight type 332.

An activity model 336 is defined as a representation of the user activity 310. For example, the navigation system 100 can build and train the activity model 336 to refine the representation of the user activity 310. For example, the activity model 336 can represent a representation of how the user performs the search query 306. For another example, the activity model 336 can represent the user's intention 302 for certain instance of the activity type 312.

Figure 4:
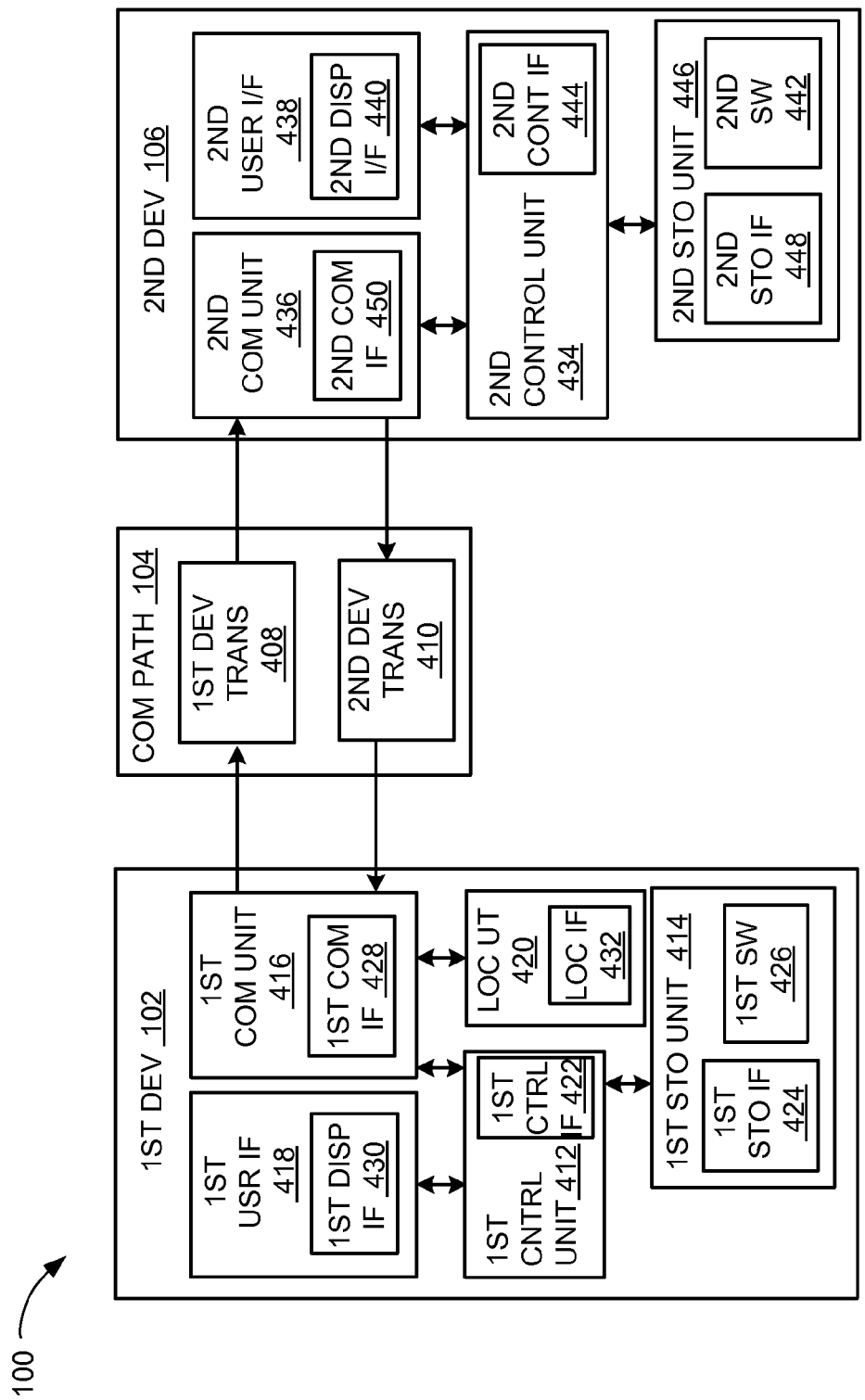
FIG. 4 is an exemplary block diagram of the navigation system.

Referring now to FIG. 4, therein is shown an exemplary block diagram of the navigation system 100. The navigation system 100 can include the first device 102, the communication path 104, and the second device 106. The first device 102 can send information in a first device transmission 408 over the communication path 104 to the second device 106. The second device 106 can send information in a second device transmission 410 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 412, a first storage unit 414, a first communication unit 416, a first user interface 418, and a location unit 420. The first control unit 412 can include a first control interface 422. The first control unit 412 can execute a first software 426 to provide the intelligence of the navigation system 100. The first control unit 412 can be implemented in a number of different manners. For example, the first control unit 412 can be a processor, an embedded processor, a microprocessor, a hardware control logic, a hardware finite state machine (FSM), a digital signal processor (DSP), or a combination thereof. The first control interface 422 can be used for communication between the first control unit 412 and other functional units in the first device 102. The first control interface 422 can also be used for communication that is external to the first device 102.

The first control interface 422 can receive information from the other functional units or from external sources, or can transmit information to the other functional units or to external destinations. The external sources and the external destinations refer to sources and destinations physically separate from the first device 102.

The first control interface 422 can be implemented in different ways and can include different implementations depending on which functional units or external units are being interfaced with the first control interface 422. For example, the first control interface 422 can be implemented with a pressure sensor, an inertial sensor, a microelectromechanical system (MEMS), optical circuitry, waveguides, wireless circuitry, wireline circuitry, or a combination thereof.

The location unit 420 can generate location information, current heading, and current speed of the first device 102, as examples. The location unit 420 can be implemented in many ways. For example, the location unit 420 can function as at least a part of a global positioning system (GPS), an inertial navigation system, a cellular-tower location system, a pressure location system, or any combination thereof.

The location unit 420 can include a location interface 432. The location interface 432 can be used for communication between the location unit 420 and other functional units in the first device 102. The location interface 432 can also be used for communication that is external to the first device 102.

The location interface 432 can receive information from the other functional units or from external sources, or can transmit information to the other functional units or to external destinations. The external sources and the external destinations refer to sources and destinations physically separate from the first device 102.

The location interface 432 can include different implementations depending on which functional units or external units are being interfaced with the location unit 420. The location interface 432 can be implemented with technologies and techniques similar to the implementation of the first control interface 422.

The first storage unit 414 can store the first software 426. The first storage unit 414 can also store the relevant information, such as advertisements, points of interest (POI), navigation routing entries, or any combination thereof.

The first storage unit 414 can be a volatile memory, a nonvolatile memory, an internal memory, an external memory, or a combination thereof. For example, the first storage unit 414 can be a nonvolatile storage such as non-volatile random access memory (NVRAM), Flash memory, disk storage, or a volatile storage such as static random access memory (SRAM).

The first storage unit 414 can include a first storage interface 424. The first storage interface 424 can be used for communication between the location unit 420 and other functional units in the first device 102. The first storage interface 424 can also be used for communication that is external to the first device 102.

The first storage interface 424 can receive information from the other functional units or from external sources, or can transmit information to the other functional units or to external destinations. The external sources and the external destinations refer to sources and destinations physically separate from the first device 102.

The first storage interface 424 can include different implementations depending on which functional units or external units are being interfaced with the first storage unit 414. The first storage interface 424 can be implemented with technologies and techniques similar to the implementation of the first control interface 422.

The first communication unit 416 can enable external communication to and from the first device 102. For example, the first communication unit 416 can permit the first device 102 to communicate with the second device 106, an attachment, such as a peripheral device or a computer desktop, and the communication path 104.

The first communication unit 416 can also function as a communication hub allowing the first device 102 to function as part of the communication path 104 and not limited to be an end point or terminal unit to the communication path 104. The first communication unit 416 can include active and passive components, such as microelectronics or an antenna, for interaction with the communication path 104.

The first communication unit 416 can include a first communication interface 428. The first communication interface 428 can be used for communication between the first communication unit 416 and other functional units in the first device 102. The first communication interface 428 can receive information from the other functional units or can transmit information to the other functional units.

The first communication interface 428 can include different implementations depending on which functional units are being interfaced with the first communication unit 416. The first communication interface 428 can be implemented with technologies and techniques similar to the implementation of the first control interface 422.

The first user interface 418 allows a user (not shown) to interface and interact with the first device 102. The first user interface 418 can include an input device and an output device. Examples of the input device of the first user interface 418 can include a keypad, a touchpad, soft-keys, a keyboard, a microphone, a camera, or any combination thereof to provide data and communication inputs.

The first user interface 418 can include a first display interface 430. The first display interface 430 can include a display, a projector, a video screen, a speaker, a headset, or any combination thereof.

The first control unit 412 can operate the first user interface 418 to display information generated by the navigation system 100. The first control unit 412 can also execute the first software 426 for the other functions of the navigation system 100, including receiving location information from the location unit 420. The first control unit 412 can further execute the first software 426 for interaction with the communication path 104 via the first communication unit 416.

The second device 106 can be optimized for implementing the present invention in a multiple device embodiment with the first device 102. The second device 106 can provide the additional or higher performance processing power compared to the first device 102. The second device 106 can include a second control unit 434, a second communication unit 436, and a second user interface 438.

The second user interface 438 allows a user (not shown) to interface and interact with the second device 106. The second user interface 438 can include an input device and an output device. Examples of the input device of the second user interface 438 can include a keypad, a touchpad, soft-keys, a keyboard, a microphone, a camera, or any combination thereof to provide data and communication inputs. Examples of the output device of the second user interface 438 can include a second display interface 440. The second display interface 440 can include a display, a projector, a video screen, a speaker, a headset, or any combination thereof.

The second control unit 434 can execute a second software 442 to provide the intelligence of the second device 106 of the navigation system 100. The second software 442 can operate in conjunction with the first software 426. The second control unit 434 can provide additional performance compared to the first control unit 412.

The second control unit 434 can operate the second user interface 438 to display information. The second control unit 434 can also execute the second software 442 for the other functions of the navigation system 100, including operating the second communication unit 436 to communicate with the first device 102 over the communication path 104.

The second control unit 434 can be implemented in a number of different manners. For example, the second control unit 434 can be a processor, an embedded processor, a microprocessor, a hardware control logic, a hardware finite state machine (FSM), a digital signal processor (DSP), or a combination thereof.

The second control unit 434 can include a second control interface 444. The second control interface 444 can be used for communication between the second control unit 434 and other functional units in the second device 106. The second control interface 444 can also be used for communication that is external to the second device 106.

The second control interface 444 can receive information from the other functional units or from external sources, or can transmit information to the other functional units or to external destinations. The external sources and the external destinations refer to sources and destinations physically separate from the second device 106.

The second control interface 444 can be implemented in different ways and can include different implementations depending on which functional units or external units are being interfaced with the second control interface 444. For example, the second control interface 444 can be implemented with a pressure sensor, an inertial sensor, a microelectromechanical system (MEMS), optical circuitry, waveguides, wireless circuitry, wireline circuitry, or a combination thereof.

A second storage unit 446 can store the second software 442. The second storage unit 446 can also store the relevant information, such as advertisements, points of interest (POI), navigation routing entries, or any combination thereof. The second storage unit 446 can be sized to provide the additional storage capacity to supplement the first storage unit 414.

For illustrative purposes, the second storage unit 446 is shown as a single element, although it is understood that the second storage unit 446 can be a distribution of storage elements. Also for illustrative purposes, the navigation system 100 is shown with the second storage unit 446 as a single hierarchy storage system, although it is understood that the navigation system 100 can have the second storage unit 446 in a different configuration. For example, the second storage unit 446 can be formed with different storage technologies forming a memory hierarchal system including different levels of caching, main memory, rotating media, or off-line storage.

The second storage unit 446 can be a volatile memory, a nonvolatile memory, an internal memory, an external memory, or a combination thereof. For example, the second storage unit 446 can be a nonvolatile storage such as non-volatile random access memory (NVRAM), Flash memory, disk storage, or a volatile storage such as static random access memory (SRAM).

The second storage unit 446 can include a second storage interface 448. The second storage interface 448 can be used for communication between the location unit 420 and other functional units in the second device 106. The second storage interface 448 can also be used for communication that is external to the second device 106.

The second storage interface 448 can receive information from the other functional units or from external sources, or can transmit information to the other functional units or to external destinations. The external sources and the external destinations refer to sources and destinations physically separate from the second device 106.

The second storage interface 448 can include different implementations depending on which functional units or external units are being interfaced with the second storage unit 446. The second storage interface 448 can be implemented with technologies and techniques similar to the implementation of the second control interface 444.

The second communication unit 436 can enable external communication to and from the second device 106. For example, the second communication unit 436 can permit the second device 106 to communicate with the first device 102 over the communication path 104.

The second communication unit 436 can also function as a communication hub allowing the second device 106 to function as part of the communication path 104 and not limited to be an end point or terminal unit to the communication path 104. The second communication unit 436 can include active and passive components, such as microelectronics or an antenna, for interaction with the communication path 104.

The second communication unit 436 can include a second communication interface 450. The second communication interface 450 can be used for communication between the second communication unit 436 and other functional units in the second device 106. The second communication interface 450 can receive information from the other functional units or can transmit information to the other functional units.

The second communication interface 450 can include different implementations depending on which functional units are being interfaced with the second communication unit 436. The second communication interface 450 can be implemented with technologies and techniques similar to the implementation of the second control interface 444.

The first communication unit 416 can couple with the communication path 104 to send information to the second device 106 in the first device transmission 408. The second device 106 can receive information in the second communication unit 436 from the first device transmission 408 of the communication path 104.

The second communication unit 436 can couple with the communication path 104 to send information to the first device 102 in the second device transmission 410. The first device 102 can receive information in the first communication unit 416 from the second device transmission 410 of the communication path 104. The navigation system 100 can be executed by the first control unit 412, the second control unit 434, or a combination thereof.

For illustrative purposes, the second device 106 is shown with the partition having the second user interface 438, the second storage unit 446, the second control unit 434, and the second communication unit 436, although it is understood that the second device 106 can have a different partition. For example, the second software 442 can be partitioned differently such that some or all of its function can be in the second control unit 434 and the second communication unit 436. Also, the second device 106 can include other functional units not shown in FIG. 4 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 420, although it is understood that the second device 106 can also operate the location unit 420.

Figure 5:
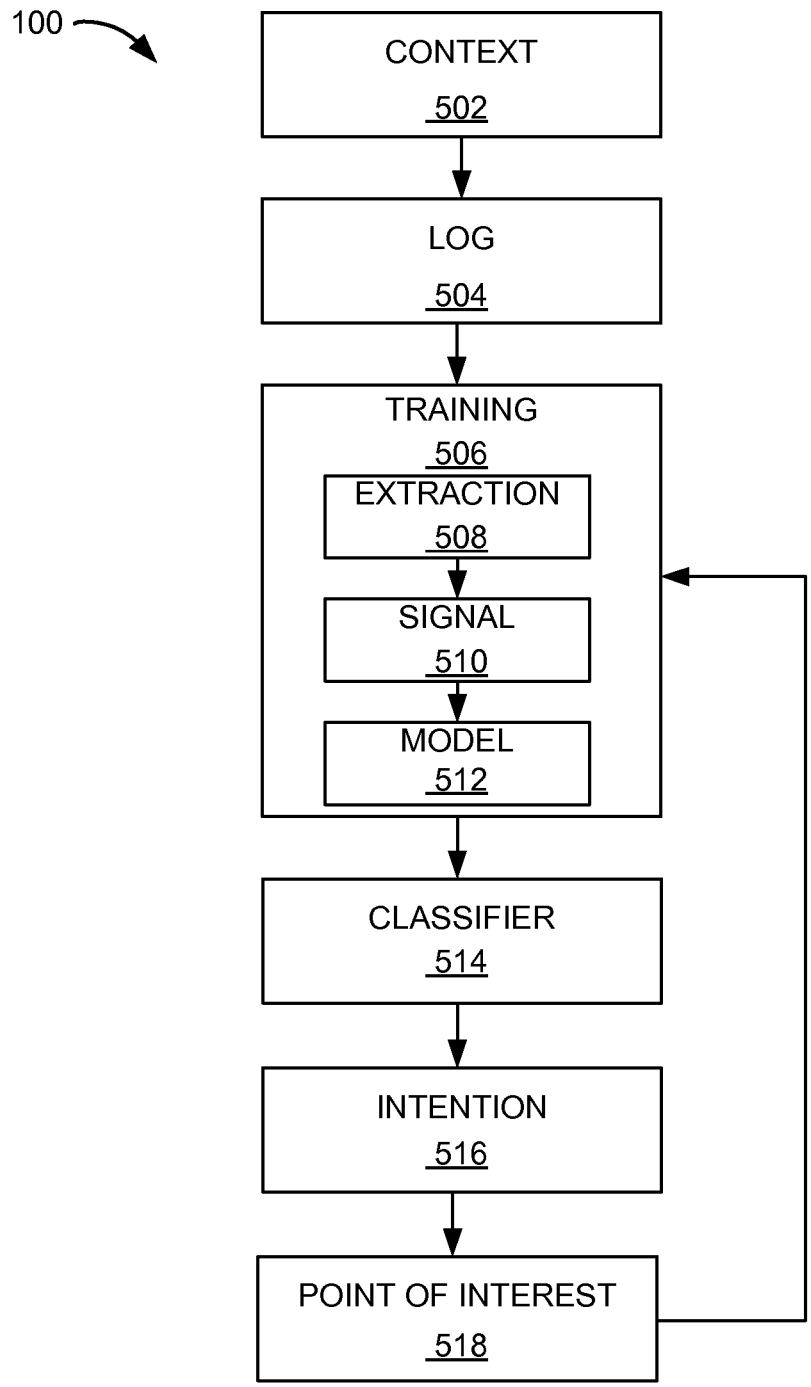
FIG. 5 is a control flow of the navigation system.

Referring now to FIG. 5, therein is shown a control flow of the navigation system 100. The navigation system 100 can include a context module 502. The context module 502 determines the travel context 212 of FIG. 2. For example, the context module 502 can determine the travel context 212 based on the travel condition 214 of FIG. 2.

The context module 502 can determine the travel context 212 in a number of ways. For example, the context module 502 can determine the travel context 212 based on the travel condition 214 surrounding the vehicle with the user of the navigation system 100 operating the first device 102 of FIG. 1. More specifically, the travel condition 214 can include the timeframe 216 of FIG. 2, the road type, the current location 206 of FIG. 2, the travel history 218 of FIG. 2, or a combination thereof.

For a specific example, the context module 502 can determine the travel context 212 representing that the user is traveling at night based on the timeframe 216 representing 9 PM. For another example, the context module 502 can determine the travel context 212 representing that the user is traveling at high speed based on the location unit 420 of FIG. 4 locating the current location 206 on the road type representing a freeway. For further example, the context module 502 can determine the travel context 212 that the user is unfamiliar with the geographic area 202 of FIG. 2 based on the travel history 218 meeting or exceeding the travel threshold 220 of FIG. 2. The context module 502 can communicate the travel context 212 to a log module 504.

The navigation system 100 can include the log module 504, which can couple to the context module 502. The log module 504 generates the activity history 308 of FIG. 3. For example, the log module 504 can generate the activity history 308 based on collecting the user entry 304 of FIG. 3.

The log module 504 can generate the activity history 308 in a number of ways. For example, the log module 504 can generate the activity history 308 based on collecting the user entry 304 made on the first device 102. More specifically, the user entry 304 can represent the search query 306 of FIG. 3 to search for a particular cuisine in the geographic area 202. Moreover, the log module 504 can generate the activity history 308 based on the user entry 304 made to the first device 102. For a specific example, the user entry 304 can represent clicking on a selection presented on the first device 102, scrolling the content displayed on the first device 102, giving oral command to the first device 102, or a combination thereof.

For another example, the log module 504 can generate the activity history 308 based on tracking the user activity 310 of FIG. 3. More specifically, the user activity 310 can represent selection on the content displayed on the first device 102, driving a vehicle, making a call from the first device 102, or a combination thereof. Moreover, the log module 504 can generate the activity history 308 based on the activity type 312 of FIG. 3 performed by the user of the navigation system 100. For a specific example, the activity type 312 can represent operating the vehicle, making a call, stopping at a particular instance of the geographic location 204 of FIG. 2, traversing through a particular instance of the geographic area 202 at a particular instance of the timeframe 216, or a combination thereof. The log module 504 can communicate the activity history 308 to a training module 506.

The navigation system 100 can include the training module 506, which can couple to the log module 504. The training module 506 generates the activity model 336 of FIG. 3. For example, the training module 506 can generate the activity model 336 based on the feature 322 of FIG. 3, the signal weight 324 of FIG. 3, the category of interest 210 of FIG. 2, the activity type 312, or a combination thereof. For further example, the training module 506 can generate the activity model 336 based on tuning with support vector machine.

The training module 506 can generate the activity model 336 in a number of ways. The training module 506 can include an extraction module 508. The extraction module 508 extracts the feature 322. For example, the extraction module 508 can extract the feature 322 from the activity history 308, the user entry 304, or a combination thereof.

The extraction module 508 can extract the feature 322 in a number of ways. For example, the extraction module 508 can extract the feature 322 representing a word from the user entry 304. More specifically, the user entry 304 can represent text entry to the first device 102. The extraction module 508 can extract the feature 322 representing the search query 306, the current location 206, the timeframe 216, the device type, the category of interest 210, or a combination thereof from the user entry 304. The device type can represent examples of the particularized machine discussed above for the first device 102, the second device 106 of FIG. 1, or a combination thereof. Furthermore, the extraction module 508 can extract the feature 322 from the activity history 308 stored in the first storage unit 414 of FIG. 4.

For a specific example, the activity history 308 can represent the user entry 304 made to the first device 102. The user entry 304 can represent a text. The extraction module 508 can extract the feature 322 representing a text using text extraction algorithm, such as tokenization, stemming, text filtering, or a combination thereof to extract a word from the user entry 304. Further the extraction module 508 can normalize the feature 322 to generate consistency in the text representing a specific word.

For further example, the extraction module 508 can extract the feature 322 representing the entry pattern 314 of FIG. 3, the category of interest 210, the entry relevancy 316 of FIG. 3, or a combination thereof from the activity history 308. More specifically, the extraction module 508 can extract the entry pattern 314, the category of interest 210, the entry relevancy 316, or a combination thereof based on the activity history 308 representing the search query 306, the user reaction, the user behavior, the language model, the websites visited, the personal information, the social media, or a combination thereof.

For a specific example, the extraction module 508 can extract the feature 322 based on the entry pattern 314 representing the user uploading a digital photograph on the social media after the user visited the geographic location 204 he or she had never visited. More specifically as an example, the extraction module 508 can extract the feature 322 based on the geographic location 204 not stored in the activity history 308 since the geographic location 204 is not stored previously. Additionally, the activity history 308 can indicate that the user entry 304 of uploading digital photographs at such instance of the geographic location 204. For a different example, the extraction module 508 can extract the feature 322 representing the category of interest 210 based on the search query 306 entered and the websites browsed to determine that the user is shopping for electronics.

For further example, the extraction module 508 can determine the entry relevancy 316 of a plurality of the feature 322 based on the entry pattern 314, the category of interest 210, the activity history 308, or a combination thereof. More specifically, a plurality of the user entry 304 can be made on day before the Cyber Monday, a discount shopping day in the United States. The entry pattern 314 can disclose that the user had visited websites with different instances of the category of interest 210, such as appliances and electronics. However, since the user made an order day before Cyber Monday, the extraction module 508 can determine the entry relevancy 316 of "Cyber Monday" between the plurality of the instances of the feature 322 in the two instances of the user entry 304.

It has been discovered the navigation system 100 determining the entry relevancy 316 of a plurality of the feature 322 improves the efficiency of determining the user's intention 302 of FIG. 3. By determining the entry relevancy 316, the navigation system 100 can determine that the plurality of the user entry 304 is related. Furthermore, by understanding the relationship of the plurality of the user entry 304, the navigation system 100 can improve the understanding of the user's intention 302. As a result, the navigation system 100 can improve the delivery of the result desired by the user for enhanced user experience operating the first device 102, the navigation system 100, or a combination thereof.

For another example, the extraction module 508 can extract the feature 322 from the travel context 212, the user activity 310, or a combination thereof. More specifically, the travel context 212 can represent that the user is traveling around the timeframe 216 of 7 pm. The travel context 212 can also represent that the user traveling towards the geographic area 202 representing the downtown area. The activity history 308 can include the user heading for dinner around the same instance of the timeframe 216. The extraction module 508 can extract the feature 322 representing the name of the restaurant made in the user entry 304 from the activity history 308 based on the travel context 212. Furthermore, the extraction module 508 can extract the feature 322 representing the category of interest 210 of restaurant or dining from the activity history 308 based on the travel context 212. The extraction module 508 can communicate the feature 322 to a signal module 510.

It has been discovered the navigation system 100 extracting the feature 322 based on the travel context 212, the user activity 310, or a combination thereof improves the efficiency of determining the user's intention 302. By extracting the feature 322 relevant to the travel context 212, the navigation system 100 can improve the accuracy of the extraction by excluding the feature 322 irrelevant to the travel context 212. As a result, the navigation system 100 can improve the delivery of the result desired by the user for enhanced user experience operating the first device 102, the navigation system 100, or a combination thereof.

The training module 506 can include the signal module 510, which can couple to the extraction module 508. The signal module 510 generates the signal weight 324. For example, the training module 506 can generate the signal weight 324 of the feature 322 based on comparing a plurality of the feature 322 relative to each other.

The signal module 510 can generate the signal weight 324 in a number of ways. For example, the signal module 510 can generate the signal weight 324 for the activity type 312. For a specific example, the signal module 510 can generate the signal weight 324 for the activity type 312 representing "drive," "call," "select," or "do nothing." For further example, the signal module 510 can generate the signal weight 324 for each instances of the category of interest 210. As an example, the signal module 510 can generate one instance of the signal weight 324 for the category of interest 210 representing "restaurant" and another instance of the signal weight 324 for the category of interest 210 representing "hardware store." The signal module 510 can generate each instances of the signal weight 324 for each instances of the activity type 312, the category of interest 210, or a combination thereof for a particular instance of the feature 322.

Furthermore, the signal module 510 can adjust the signal weight 324 of the feature 322 relative to the each instances of the activity type 312, the category of interest 210, or a combination thereof. More specifically, if the feature 322 can have the positive weight 326 of FIG. 3 for an instance of the category of interest 210, the feature 322 can have the negative weight 328 of FIG. 3 for another instance of the category of interest 210. For example, if the signal weight 324 for the feature 322 can represent "+1" for the category of interest 210 "restaurant," the signal weight 324 can be "–1" for the category of interest 210 "hardware" for the feature 322. The signal weight 324 can range from 0 to 1, 0 to 100, or a combination thereof.

The dichotomy of two instances of the signal weight 324 represented as the positive weight 326 and the negative weight 328 for the same instance of the feature 322 can illustrate that the feature 322 is leaning towards the activity type 312, the category of interest 210, or a combination thereof if the signal weight 324 is positive and leaning away if the signal weight 324 is negative. Moreover, if the feature 322 has the positive weight 326 for the activity type 312, the category of interest 210, or a combination thereof, then the feature 322 can have the negative weight 328 for different instance of the activity type 312, the category of interest 210, or a combination thereof.

For a specific example, if the user performs a particular instance of the activity type 312 after the user entry 304, the feature 322 in the user entry 304 can have the positive weight 326 for the particular instance of the activity type 312 and negative weight 328 for the other instance of the activity type 312. More specifically, the user entry 304 can represent the search query 306 for a restaurant. The activity type 312 can represent "driving towards the restaurant" after the user entry 304. The signal module 510 can generate the positive weight 326 for "driving" for the feature 322 representing the restaurant. In contrast, the signal module 510 can generate the negative weight 328 for other instances of the activity type 312 representing "calling the restaurant." Additionally, the signal module 510 can generate the signal weight 324 of the negative weight 328 if the activity type 312 represents a non-action by the user.

It has been discovered that the navigation system 100 adjusting the signal weight 324 of the feature 322 according to the activity type 312, the category of interest 210, or a combination thereof improves the accuracy of determining the user's intention 302. By adjusting the signal weight 324 as the positive weight 326 for one instance of the activity type 312 or the category of interest 210 and the negative weight 328 for another instance of the activity type 312 or the category of interest 210, the navigation system 100 can determine that the user's intention 302 leans toward particular instance of the activity type 312 or the category of interest 210. As a result, the navigation system 100 can improve the delivery of the result desired by the user for enhanced user experience operating the first device 102, the navigation system 100, or a combination thereof.

For another example, the signal module 510 can determine the weight priority 334 of FIG. 3 based on the weight type 332 of FIG. 3. As discussed above, the signal weight 324 can be generated for each instance of a plurality of the activity type 312, the category of interest 210, or a combination thereof. As a result, each instances of the signal weight 324 can represent different instances of the weight type 332. And the signal weight 324 for each instances of the weight type 332 can have an equal weight or not. More specifically, some instances of the weight type 332 can have the weight priority 334 that is higher or lower than another instance of the weight type 332.

For a specific example, the signal module 510 can determine the weight priority 334 based on the activity history 308, the travel context 212, the category of interest 210, the activity type 312, the user entry 304, or a combination thereof. As an example, the travel context 212 can represent that the user is traveling around 7 pm. The user entry 304 can represent the search query 306 for food. The activity history 308 can indicate that the user tends to search for place to eat around 7 pm. The activity history 308 can also indicate that the activity type 312 following the search query 306 is driving to the restaurant. As a result, for the travel context 212 around 7 pm, the signal module 510 can determine the weight priority 334 for the signal weight 324 generated for the category of interest 210 of "food," the activity type 312 of "driving," or a combination thereof can have the weight priority 334 that is higher than other instances of the weight type 332.

It has been discovered that the navigation system 100 determining the weight priority 334 based on the weight type 332 improves the accuracy of determining the user's intention 302. By determining the weight priority 334 according to the weight type 332, the navigation system 100 can resolve the conflict when a plurality of the signal weight 324 has equal values. By prioritizing the signal weight 324 according to the weight priority 334, the navigation system 100 can improve the delivery of the result desired by the user for the enhanced user experience operating the first device 102, the navigation system 100, or a combination thereof.

The signal module 510 can generate the signal weight 324 for the feature 322 extracted. More specifically, the signal module 510 can generate the signal weight 324 for each instances of the activity type 312, the category of interest 210, or a combination thereof as discussed above for the feature 322 extracted. For example, the signal module 510 can generate the signal weight 324 for the feature 322 extracted from the activity history 308. The signal module 510 can communicate the signal weight 324 to a model module 512.

The training module 506 can include the model module 512, which can couple to the signal module 510. The model module 512 generates the activity model 336. For example, the model module 512 can generate the activity model 336 based on the feature 322, the signal weight 324, the category of interest 210, or a combination thereof.

The model module 512 can generate the activity model 336 in a number of ways. For example, the model module 512 can generate the activity model 336 having the feature 322 with the signal weight 324. More specifically, the model module 512 can generate the activity model 336 having a plurality of the feature 322 to represent the user activity 310. For a specific example, the model module 512 can generate the activity model 336 to represent that the user activity 310 representing the search query 306 can have the positive weight 326, the negative weight 328, or a combination thereof for the activity type 312, the category of interest 210, or a combination thereof.

For a specific example, the search query 306 can include "Dunkin Donuts™." The model module 512 can generate the activity model 336 to represent the search query 306 of "Dunkin Donuts™." Moreover, the activity model 336 can include the signal weight 324 for the plurality of the feature 322 in the search query 306. For example, the plurality of the feature 322 can represent "Dunkin," "Donuts," and "Dunkin Donuts™." As discussed above, the instances of the feature 322 can have the positive weight 326 for the category of the interest of "donut shop" but the negative weight 328 for "hotel," "gas," or a combination thereof. Furthermore, the feature 322 can have the positive weight 326 for the activity type 312 representing "driving" and the negative weight 328 for the activity type 312 representing "calling." The activity model 336 can represent each instances of the feature 322 independently with the corresponding instances of the positive weight 326, the negative weight 328, or a combination thereof. Further, the activity model 336 can represent the aggregation of the instances of the feature 322 to form the search query 306 with the corresponding instances of the positive weight 326, the negative weight 328, or a combination thereof. The model module 512 can communicate the activity model 336 to a classifier module 514.

The navigation system 100 can include the classifier module 514. The classifier module 514 classifies the user entry 304. For example, the classifier module 514 can classify the user entry 304 newly received based on the activity model 336.

The classifier module 514 can classify the user entry 304 in a number of ways. For example, the classifier module 514 can classify the user entry 304 based on comparing the feature 322 of the user entry 304 to the feature 322 of the activity model 336. More specifically, as discussed above, the classifier module 514 can extract the feature 322 from the user entry 304. The classifier module 514 can compare the feature 322 to the feature 322 of the activity model 336 using the string comparison algorithm. If the feature 322 of the user entry 304 matches the feature 322 for the activity model 336, the feature 322 of the user entry 304 can have the signal weight 324 as the feature 322 of the activity model 336.

More specifically, the activity model 336 can have the feature 322 having the positive weight 326 for "gas station." The user entry 304 can have the feature 322 representing the "gas station." As a result, the classifier module 514 can determine the signal weight 324 for the feature 322 of the user entry 304 to be the positive weight 326 for "gas station." For further example, the classifier module 514 can determine the signal weight 324 for other instances of the category of interest 210. More specifically, the classifier module 514 can determine the signal weight 324 for the feature 322 to be the negative weight 328 for other instances of the weight type 332.

For a different example, the classifier module 514 can identify the entry category 318 of FIG. 3 of the user entry 304. More specifically, the classifier module 514 can identify the entry category 318 based on the feature 322 extracted from the user entry 304. For example, if the feature 322 extracted can represent "hotel," the classifier module 514 can identify the entry category 318 to represent the category of interest 210 for "lodging" by comparing the activity model 336 having the same instance of the feature 322. Moreover, the activity model 336 can have the same instance of the feature 322 categorized under the category of interest 210 for "lodging." As a result, the entry category 318 can also represent the category of interest 210 for "lodging."

For further example, the classifier module 514 can identify the entry category 318 of the user entry 304 based on the activity type 312 subsequent to the user entry 304. Continuing with the previous example, the user entry 304 can have the feature 322 representing "hotel." However, the activity type 312 can represent "calling the restaurant in the hotel." As a result, the classifier module 514 can identify the activity model 336 that includes the feature 322 and the activity type 312. Based on the signal weight 324 for the feature 322 and the activity type 312, the classifier module 514 can determine whether the signal weight 324 for the feature 322, "hotel," is greater than the signal weight 324 for the activity type 312, "calling for the restaurant." If the signal weight 324 for the activity type 312 is greater than the signal weight 324 for the feature 322, the classifier module 514 can classify the entry category 318 under the category of interest 210 for "restaurant" instead of the "hotel." The result can be vice versa based on the greater of the signal weight 324.

For further example, the classifier module 514 can calculate the category score 320 of FIG. 3 for the user entry 304. The classifier module 514 can calculate the category score 320 the based on the signal weight 324 for the category of interest 210 for the feature 322. Moreover, the classifier module 514 can calculate the category score 320 for the feature 322 extracted based on the signal weight 324 for each instances of the category of interest 210. The classifier module 514 can identify the entry category 318 based on the highest instance of the category score 320 to determine whether the user entry 304 can be classified to a specific instance of the category of interest 210. The classifier module 514 can communicate the category score 320, the entry category 318, or a combination thereof to an intention module 516.

It has been discovered that the navigation system 100 classifying the user entry 304 based on comparing the activity model 336 improves the accuracy of determining the user's intention 302. By comparing the user entry 304 to the activity model 336, the navigation system 100 can determine the signal weight 324 of the feature 322 in the user entry 304. As a result, the navigation system 100 can determine the user's intention 302 to improve the delivery of the result desired by the user for enhanced user experience operating the first device 102, the navigation system 100, or a combination thereof.

The navigation system 100 can include the intention module 516, which can couple to the classifier module 514. The intention module 516 determines the user's intention 302. For example, the intention module 516 can determine the user's intention 302 based on the category score 320, the entry category 318, or a combination thereof.

The intention module 516 can determine the user's intention 302 in a number of ways. For example, the intention module 516 can determine the user's intention 302 based on the user entry 304, the entry category 318, or a combination thereof. As discussed above, the feature 322 extracted from the user entry 304 can have the entry category 318 identified. Based on the entry category 318, the intention module 516 can determine the user's intention 302 for the user entry 304. For example, the feature 322 of the user entry 304 can represent "hotel." However, the entry category 318 identified can represent "restaurant." As a result, the intention module 516 can determine that the user's intention 302 is for the restaurant at the hotel and not the hotel itself for lodging.

For another example, the intention module 516 can determine the user's intention 302 based on the category score 320 of the feature 322 for the user entry 304. As discussed above, the feature 322 can have the category score 320 calculated based on the signal weight 324. The intention module 516 can determine the user's intention 302 based on the category score 320 having the highest value. The intention module 516 can communicate the user's intention 302 to a point of interest module 518.

The navigation system 100 can include the point of interest module 518, which can couple to the intention module 516. The point of interest module 518 generates the point of interest 208 of FIG. 2. For example, the point of interest module 518 can generate the point of interest 208 based on the user's intention 302. As discussed above, the user's intention 302 can represent search for a restaurant instead of hotel. As a result, the point of interest module 518 can generate the point of interest 208 representing a restaurant based on the user's intention 302. The point of interest module 518 can communicate the point of interest 208 to the training module 506.

For illustrative purposes, the navigation system 100 is described with the training module 506 generating the activity model 336, although it is understood that the training module 506 can operate differently. For example, the training module 506 can update the signal weight 324, the activity model 336, or a combination thereof. More specifically, the training module 506 can update the signal weight 324, the activity model 336, or a combination thereof based on the activity type 312 performed to the point of interest 208 generated.

The physical transformation from traveling from one instance of the travel context 212 to another instance of the travel context 212 results in the movement in the physical world, such as people using the first device 102, the vehicle, or a combination thereof, based on the operation of the navigation system 100. As the movement in the physical world occurs, the movement itself creates additional information that is converted back into determining the signal weight 324 for the continued operation of the navigation system 100 and to continue the movement in the physical world.

The first software 426 of FIG. 4 of the first device 102 of FIG. 4 can include the modules for the navigation system 100. For example, the first software 426 can include the context module 502, the log module 504, the training module 506, the classifier module 514, the intention module 516, and the point of interest module 518.

The first control unit 412 of FIG. 4 can execute the first software 426 for the context module 502 to determine the travel context 212. The first control unit 412 can execute the first software 426 for the log module 504 to generate the activity history 308. The first control unit 412 can execute the first software 426 for the training module 506 to generate the activity model 336. The first control unit 412 can execute the first software 426 for the classifier module 514 to classify the user entry 304. The first control unit 412 can execute the first software 426 for the intention module 516 to determine the user's intention 302. The first control unit 412 can execute the first software 426 for the point of interest module 518 to generate the point of interest 208.

The second software 442 of FIG. 4 of the second device 106 of FIG. 4 can include the modules for the navigation system 100. For example, the second software 442 can include the context module 502, the log module 504, the training module 506, the classifier module 514, the intention module 516, and the point of interest module 518.

The second control unit 434 of FIG. 4 can execute the second software 442 for the context module 502 to determine the travel context 212. The second control unit 434 can execute the second software 442 for the log module 504 to generate the activity history 308. The second control unit 434 can execute the second software 442 for the training module 506 to generate the activity model 336. The second control unit 434 can execute the second software 442 for the classifier module 514 to classify the user entry 304. The second control unit 434 can execute the second software 442 for the intention module 516 to determine the user's intention 302. The second control unit 434 can execute the second software 442 for the point of interest module 518 to generate the point of interest 208.

The modules of the navigation system 100 can be partitioned between the first software 426 and the second software 442. The second software 442 can include the context module 502, the log module 504, the training module 506, the classifier module 514, and the intention module 516. The second control unit 434 can execute modules partitioned on the second software 442 as previously described.

The first software 426 can include the point of interest module 518. Based on the size of the first storage unit 414, the first software 426 can include additional modules of the navigation system 100. The first control unit 412 can execute the modules partitioned on the first software 426 as previously described.

The first control unit 412 can operate the first communication unit 416 of FIG. 4 to communicate the user entry 304, the signal weight 324, the activity model 336, the user's intention 302, the point of interest 208, or a combination thereof to or from the second device 106. The first control unit 412 can operate the first software 426 to operate the location unit 420 of FIG. 4. The second control unit 434 can operate the second communication unit 436 of FIG. 4 to communicate the user entry 304, the signal weight 324, the activity model 336, the user's intention 302, the point of interest 208, or a combination thereof to or from the first device 102 through the communication path 104 of FIG. 4.

The first control unit 412 can operate the first user interface 418 of FIG. 4 to present the digital representation of the geographic area 202, the current location 206, the geographic location 204, the point of interest 208, or a combination thereof. The second control unit 434 can operate the second user interface 438 of FIG. 4 to present the digital representation of the geographic area 202, the current location 206, the geographic location 204, the point of interest 208, or a combination thereof.

The navigation system 100 describes the module functions or order as an example. The modules can be partitioned differently. For example, the log module 504 and the training module 506 can be combined. Each of the modules can operate individually and independently of the other modules. Furthermore, data generated in one module can be used by another module without being directly coupled to each other. For example, the training module 506 can receive the travel context 212 from the context module 502. Further, one module communicating to another module can represent one module sending, receiving, or a combination thereof the data generated to or from another module.

The modules described in this application can be hardware implementation or hardware accelerators in the first control unit 412 or in the second control unit 434. The modules can also be hardware implementation or hardware accelerators within the first device 102 or the second device 106 but outside of the first control unit 412 or the second control unit 434, respectively as depicted in FIG. 4. However, it is understood that the first control unit 412, the second control unit 434, or a combination thereof can collectively refer to all hardware accelerators for the modules. Furthermore, the first control unit 412, the second control unit 434, or a combination thereof can be implemented as software, hardware, or a combination thereof.

The modules described in this application can be implemented as instructions stored on a non-transitory computer readable medium to be executed by the first control unit 412, the second control unit 434, or a combination thereof. The non-transitory computer medium can include the first storage unit 414, the second storage unit 446 of FIG. 4, or a combination thereof. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the navigation system 100 or installed as a removable portion of the navigation system 100.

It has been discovered that the navigation system 100 generating the signal weight 324 for the feature 322 from the user entry 304, the activity history 308, or a combination thereof can improve the accuracy of determining the user's intention 302. By generating the signal weight 324 for each instances of the feature 322, the navigation system 100 can determine what the user actually intended from user entry 304 made to the navigation system 100. As a result, the navigation system 100 can improve the efficiency of providing the point of interest 208 relevant to the user for safer operation of the vehicle, the navigation system 100, or a combination thereof.

Figure 6:
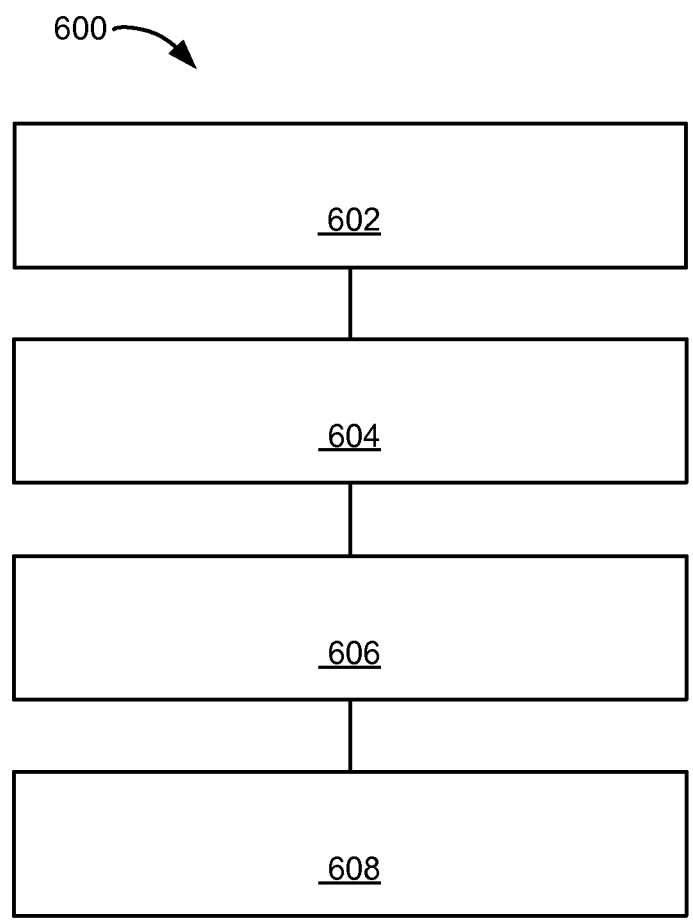
FIG. 6 is a flow chart of a method of operation of the navigation system in a further embodiment of the present invention.

Referring now to FIG. 6, therein is shown a flow chart of a method 600 of operation of the navigation system 100 in a further embodiment of the present invention. The method 600 includes: generating a signal weight with a control unit based on a feature extracted from a user activity in a block 602; generating an activity model based on the signal weight for representing the feature as a positive weight or a negative weight depending on an activity type, a category of interest, or a combination thereof in a block 604; classifying a user entry based on comparing the feature of the user entry to the feature represented in the activity model in a block 606; and determining a user's intention based on the user entry classified for presenting a point of interest on a device in a block 608.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
generating a signal weight with a control unit based on a feature extracted from a user activity;
generating an activity model based on the signal weight for representing the feature as a positive weight, representing the signal weight above a weight threshold, or a negative weight, representing the signal weight below the weight threshold, depending on an activity type, a category of interest, or a combination thereof;
classifying a user entry newly received, including multiple instances of the feature including the activity type and the category of interest, based on comparing the activity type and the category of interest to each other for identifying the feature with the higher instance of the signal weight to compare with the activity model; and
determining a user's intention based on the user entry classified for presenting a point of interest on a device.

2. The method as claimed in claim 1 further comprising adjusting the signal weight of the feature relative to each instance of a plurality of the activity type, the category of interest, or a combination thereof.

3. The method as claimed in claim 1 wherein generating the signal weight includes generating the signal weight for a same instance of the feature as the positive weight for one instance of the activity type and the negative weight for another instance of the activity type.

4. The method as claimed in claim 1 wherein generating the signal weight includes generating the signal weight for a same instance of the feature as the positive weight for one instance of the category of interest and the negative weight for another instance of the category of interest.

5. The method as claimed in claim 1 further comprising determining a weight priority of a plurality of the signal weight based on a travel context for identifying the user's intention for the user activity in a given instance of the travel context.

6. The method as claimed in claim 1 further comprising determining an entry relevancy of a plurality of the feature based on an entry pattern, the category of interest, an activity history, or a combination thereof.

7. The method as claimed in claim 1 further comprising determining a weight priority based on a weight type of the signal weight generated for the activity type, the category of interest, or a combination thereof.

8. The method as claimed in claim 1 further comprising determining a weight priority based on a travel context for prioritizing one instance of the signal weight over another instance of the signal weight in a given instance of the travel context.

9. The method as claimed in claim 1 further comprising identifying an entry category of the user activity based on the activity type subsequent to the user activity.

10. The method as claimed in claim 1 further comprising calculating a category score based on the signal weight of the feature for the category of interest.

11. A navigation system comprising:
a control unit for:
generating a signal weight with a control unit based on a feature extracted from a user activity,
generating an activity model based on the signal weight for representing the feature as a positive weight, representing the signal weight above a weight threshold, or a negative weight, representing the signal weight below the weight threshold, depending on an activity type, a category of interest, or a combination thereof,
classifying a user entry newly received, including multiple instances of the feature including the activity type and the category of interest, based on comparing the activity type and the category of interest to each other for identifying the feature with the higher instance of the signal weight to compare with the activity model,
determining a user's intention based on the user entry classified, and
a communication interface, coupled to the control unit, for communicating the user's intention for displaying a point of interest on a device.

12. The system as claimed in claim 11 wherein the control unit is for adjusting the signal weight of the feature relative to each instance of a plurality of the activity type, the category of interest, or a combination thereof.

13. The system as claimed in claim 11 wherein the control unit is for generating the signal weight for a same instance of the feature as the positive weight for one instance of the activity type and the negative weight for another instance of the activity type.

14. The system as claimed in claim 11 wherein the control unit is for generating the signal weight for a same instance of the feature as the positive weight for one instance of the category of interest and the negative weight for another instance of the category of interest.

15. The system as claimed in claim 11 wherein the control unit is for determining a weight priority of a plurality of the signal weight based on a travel context for identifying the user's intention for the user activity in a given instance of the travel context.

16. A non-transitory computer readable medium including instructions for execution, the instructions comprising:
generating a signal weight based on a feature extracted from a user activity;
generating an activity model based on the signal weight for representing the feature as a positive weight, representing the signal weight above a weight threshold, or a negative weight, representing the signal weight below the weight threshold, depending on an activity type, a category of interest, or a combination thereof;
classifying a user entry newly received, including multiple instances of the feature including the activity type and the category of interest, based on comparing the activity type and the category of interest to each other for identifying the feature with the higher instance of the signal weight to compare with activity model; and
determining a user's intention based on the user entry classified for presenting a point of interest on a device.

17. The non-transitory computer readable medium as claimed in claim 16 further comprising adjusting the signal weight of the feature relative to each instance of a plurality of the activity type, the category of interest, or a combination thereof.

18. The non-transitory computer readable medium as claimed in claim 16 wherein generating the signal weight includes generating the signal weight for a same instance of the feature as the positive weight for one instance of the activity type and the negative weight for another instance of the activity type.

19. The non-transitory computer readable medium as claimed in claim 16 wherein generating the signal weight includes generating the signal weight for a same instance of the feature as the positive weight for one instance of the category of interest and the negative weight for another instance of the category of interest.

20. The non-transitory computer readable medium as claimed in claim 16 further comprising determining a weight priority of a plurality of the signal weight based on a travel context for identifying the user's intention for the user activity in a given instance of the travel context.

* * * * *